US010449726B2

(12) United States Patent
Vergara et al.

(10) Patent No.: US 10,449,726 B2
(45) Date of Patent: Oct. 22, 2019

(54) SEWING AS A METHOD FOR JOINT REINFORCEMENT BETWEEN PLASTICS AND OTHER MATERIALS

(71) Applicant: THE REGENTS OF THE UNIVERSITY OF CALIFORNIA, Oakland, CA (US)

(72) Inventors: Julio Vergara, Los Angeles, CA (US); Andrew Padula, Laguna Niguel, CA (US); Lucas Restrepo, Scottsdale, AZ (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 230 days.

(21) Appl. No.: 15/407,165

(22) Filed: Jan. 16, 2017

(65) Prior Publication Data
US 2017/0190102 A1 Jul. 6, 2017

Related U.S. Application Data

(63) Continuation of application No. PCT/US2015/040997, filed on Jul. 17, 2015.
(Continued)

(51) Int. Cl.
B29C 65/72 (2006.01)
B29C 65/62 (2006.01)
(Continued)

(52) U.S. Cl.
CPC ............. *B29C 65/72* (2013.01); *B29C 33/40* (2013.01); *B29C 65/4825* (2013.01); *B29C 65/4835* (2013.01); *B29C 65/62* (2013.01); *B29C 66/1122* (2013.01); *B29C 66/43* (2013.01); *B29C 66/53461* (2013.01); *B29C 66/71* (2013.01); *B29C 66/74281* (2013.01); *B29C 66/112* (2013.01); *B29C 66/114* (2013.01); *B29K 2883/00* (2013.01); *B29K 2905/00* (2013.01); *B29K 2905/10* (2013.01); *B29L 2031/757* (2013.01)

(58) Field of Classification Search
CPC ..... B29C 33/40; B29C 65/72; B29C 65/4825; B29C 65/4835; B29C 65/62
See application file for complete search history.

(56) References Cited

U.S. PATENT DOCUMENTS 4,331,495 A * 5/1982 Lackman ............. B29C 70/865
156/93
5,624,622 A 4/1997 Boyce et al.
(Continued)

OTHER PUBLICATIONS

Korean Intellectual Property Office (KIPO), International Search Report and Written Opinion, dated Nov. 2, 2015, pp. 1-12, with claims searched, pp. 13-15.

*Primary Examiner* — Jeffrey H Aftergut
*Assistant Examiner* — Jaeyun Lee
(74) *Attorney, Agent, or Firm* — O'Banion & Ritchey LLP; John P. O'Banion

(57) ABSTRACT

A method for reinforcing joints between one or more components is presented. Adhesive is applied to joint areas of contact between the components and the components are stitched together at the joint areas to ensure that the joints are mechanically stable enough to withstand stresses such as pressurization and external manipulation.

5 Claims, 6 Drawing Sheets

Related U.S. Application Data

(60) Provisional application No. 62/025,906, filed on Jul. 17, 2014.

(51) Int. Cl.
    *B29C 65/48*     (2006.01)
    *B29C 65/00*     (2006.01)
    *B29C 33/40*     (2006.01)
    B29L 31/00     (2006.01)

(56) References Cited

U.S. PATENT DOCUMENTS

| | | |
|---|---|---|
| 6,106,646 A | 8/2000 | Fairbanks |
| 6,187,411 B1 | 2/2001 | Palmer |
| 6,455,148 B1 * | 9/2002 | Spears ............... B32B 5/18 |
| | | 428/315.5 |
| 7,897,225 B2 | 3/2011 | Campbell et al. |
| 8,663,770 B2 | 3/2014 | Zalewski et al. |
| 2010/0021682 A1 | 1/2010 | Liang et al. |
| 2013/0009416 A1 * | 1/2013 | Wenzel ............... D05B 1/06 |
| | | 296/1.08 |

* cited by examiner

SEWING AS A METHOD FOR JOINT REINFORCEMENT BETWEEN PLASTICS AND OTHER MATERIALS

CROSS-REFERENCE TO RELATED APPLICATIONS

This application is a 35 U.S.C. § 111(a) continuation of PCT international application number PCT/US2015/040997 filed on Jul. 17, 2015, incorporated herein by reference in its entirety, which claims priority to, and the benefit of, U.S. provisional patent application Ser. No. 62/025,906 filed on Jul. 17, 2014, incorporated herein by reference in its entirety. Priority is claimed to each of the foregoing applications.

The above-referenced PCT international application was published as PCT International Publication No. WO 2016/011408 on Jan. 21, 2016, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

Not Applicable

BACKGROUND

1. Technical Field

The technology of this disclosure pertains generally to mechanically integrating plastic components with other components, and more particularly to reinforcing adhered joints between plastic components and other components.

2. Background Discussion

The use of rubber, silicone, and other plastic compounds to make molds for various engineering applications is a rapidly growing industry. The flexibility and tensile strength of silicone and rubber compounds are desired qualities for many applications, including designing and building three-dimensional (3D) molds with precise structural features. However, a common occurrence is that silicone molded units must be combined either with other silicone or plastic molded products or with structural components made of metals or other materials. In these cases, it is necessary to mechanically integrate various components using adhesive compounds. The use of adhesives to join two pieces of plastic material or a plastic and a non-plastic component may be sufficient for many practical applications. However, in several circumstances, the mechanical strength of the adhesive per unit of joint area is insufficient and often the contact area is subject to deterioration from external manipulation.

The standard method to ensure gas or liquid tightness in plastic molds with circulating fluids is to manufacture them as a single piece using standard molding procedures. However, due to the complexity of some integrated designs or the need to use different types of materials, it becomes necessary to use adhesives to join various parts. How to ensure mechanically stable joints that are subject to either stresses inherent to their function (e.g. pressurized joints) or to external manipulation, is an outstanding and unresolved issue in the industry. Though the adhesive industry has made great progress in offering a wide range of compounds with excellent properties to adhere joints that are gas or liquid tight, a serious problem is that the resistance to pressurization is often quite limited.

BRIEF SUMMARY

Embodiments of the present disclosure can avoid the shortcomings of the standard methods for ensuring joints are mechanically stable enough to endure stresses such as pressurization by using stitches (made with threads of nylon or other materials) as reinforcements in either homologous joints (same compound) or heterologous joints (e.g. metal/silicone, rubber/silicone, any plastic/rubber, etc.).

In one embodiment of the present disclosure, an adhesive material can be applied to the area where a joint will be formed by integrated components. The adhesive can be placed on either of the component pieces. After the adhesive is applied, the pieces can be pushed together to join and seal the opposing surfaces at the joint areas. Using a stitching material, the component pieces may then be stitched together at the joint areas to reinforce the joint areas of contact.

In another embodiment of the present disclosure, a molded component made from a synthetic material such as plastic, silicone, rubber, etc. is joined to a metal plate. A sewing guide pattern is created on the metal plate by drilling holes in the plate along the sections that will form the joint areas. Holes may or may not be drilled in the mold component, depending on whether or not the mold component material can be pierced by the sewing tool. Adhesive is applied to one or both of the components on the portions that will form the joint areas. The metal plate and mold components are pushed together to form the adhered joint areas of contact. Using a stitching material, the metal plate and mold component are then stitched together at the joint areas using the pattern of holes that were drilled into the metal plate as a guide.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

Figure 3A:
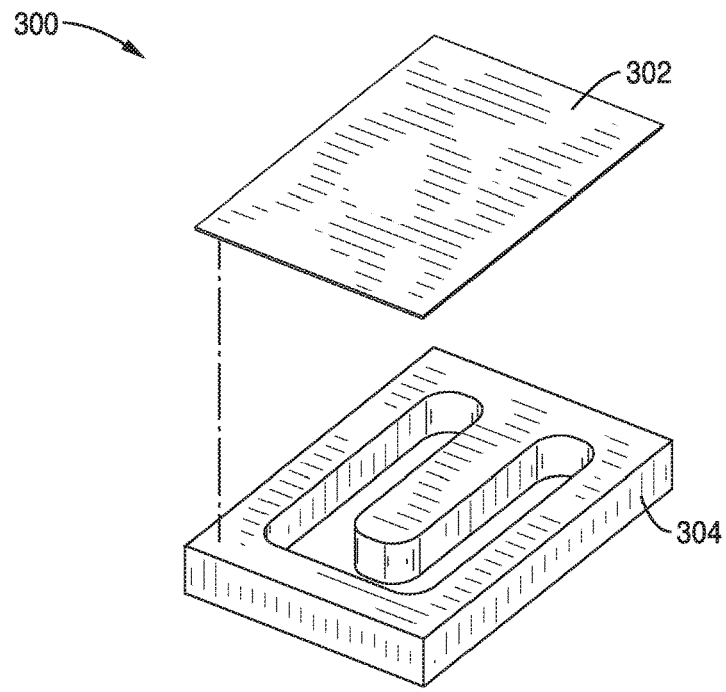
Figure 3B:
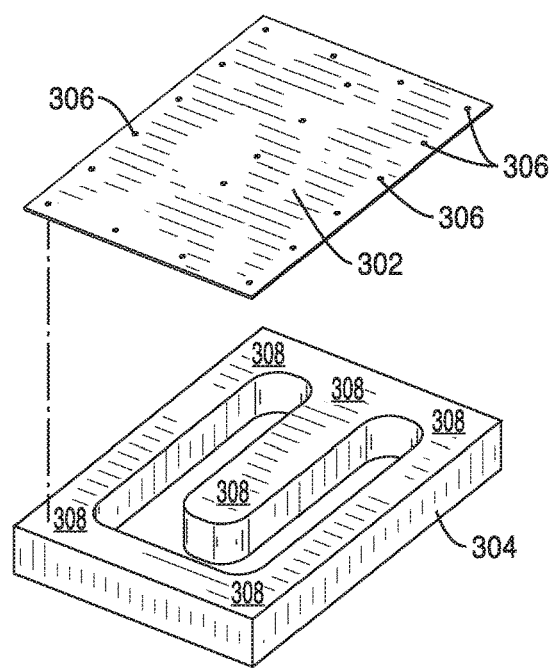
Figure 3C:
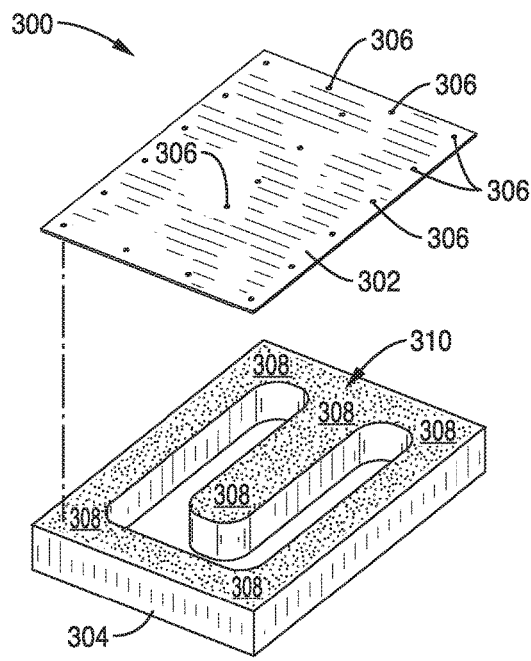
Figure 3D:
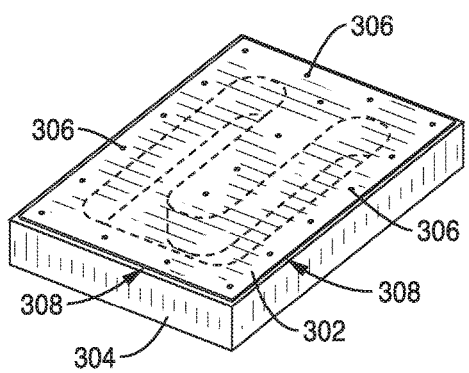
Figure 3E:
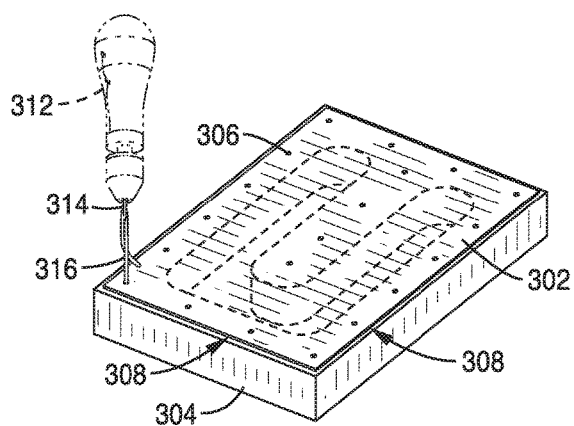

FIG. 3A through FIG. 3E are schematic top perspective views of an example embodiment, in which a copper sheet is joined to a three-dimensional (3D) silicone mold with an internal cavity. FIG. 3A shows the metal plate and the mold to be joined. FIG. 3B shows the pattern of holes drilled into the metal plate. FIG. 3C shows the adhesive applied to the mold. FIG. 3D shows the metal plate and the mold in contact. FIG. 3E shows how the glued components are sewn together using a standard awl with a threaded needle.

Figure 4A:
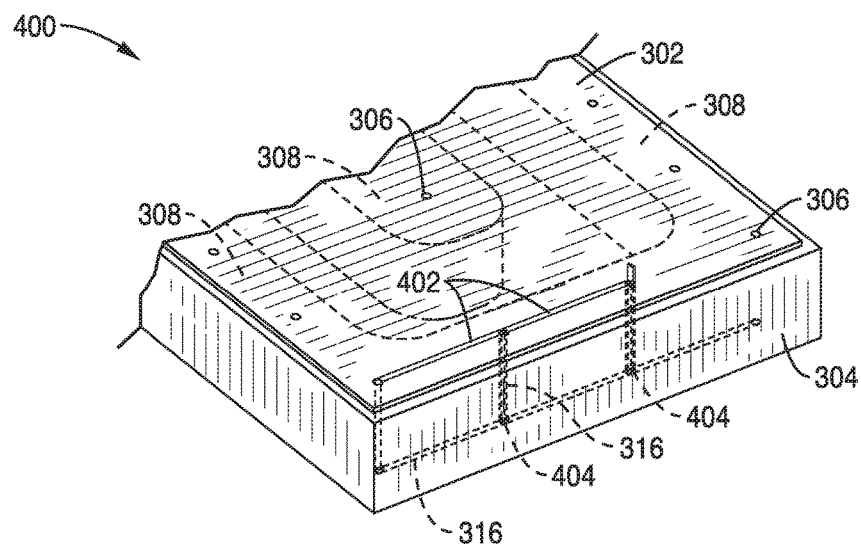
Figure 4B:
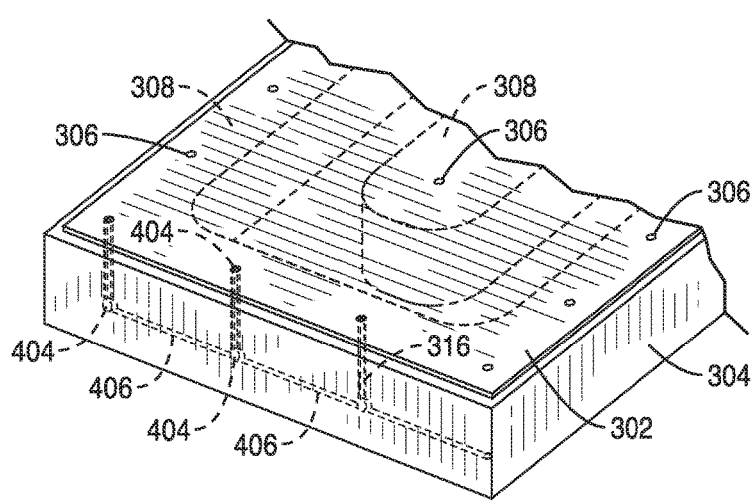

FIG. 4A and FIG. 4B are schematic diagrams showing close up views of the stitching through the metal plate and silicone mold of the embodiment shown in FIG. 3A through FIG. 3E.

DETAILED DESCRIPTION

Described herein are methods for reinforcing the mechanical stability of joints formed when two or more components are joined together using sewing material to sew along the joint areas, thereby attaining superior resistance to pressure and external handling. The joints may be made gas or liquid tight by adjusting the tightness of the stitches during the sewing process and by using adhesives to prevent gas or liquid leaking through the stitches. The stitches maintain the flexibility of the adjoining materials and provide superior performance with respect to alternative reinforcement approaches such as the use of bolts, nails, or staples, which by necessity are made of rigid materials.

Referring more specifically to the drawings, for illustrative purposes, embodiments of the methods for reinforcing joints formed by integrating two or more components, one of which can be made of a plastic material are described herein and depicted generally in FIG. 1 through FIG. 4B. It will be appreciated that the methods may vary as to the specific steps and sequence without departing from the basic concepts as disclosed herein. The method steps are merely exemplary of the order that these steps may occur. The steps may occur in any order that is desired, such that it still performs the goals of the claimed technology.

Figure 1A:
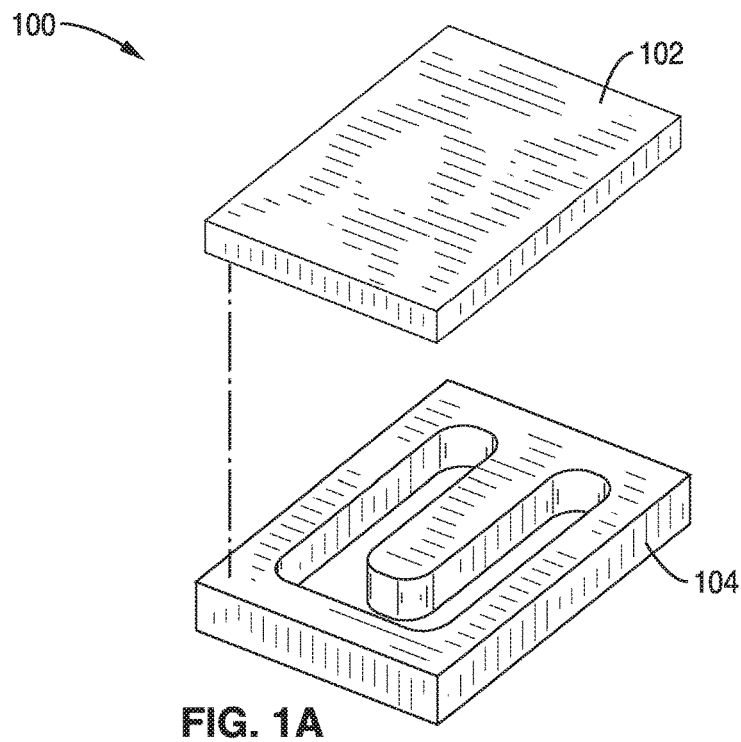
FIG. 1A is a schematic diagram of a top perspective view of one plastic component to be joined to another plastic component according to one embodiment of the present disclosure.

Referring to FIG. 1A, a schematic diagram of the process 100 of forming fluid tight joints with a first plastic component 102 that will be joined to a second plastic component 104 is shown. In this example, the second plastic component 104 is shown as a mold that could have been produced using a three dimensional (3D) printer, for example. However, it will be appreciated that the components to be joined can be of any shape or size without departing from the teachings of the present description.

Figure 1B:
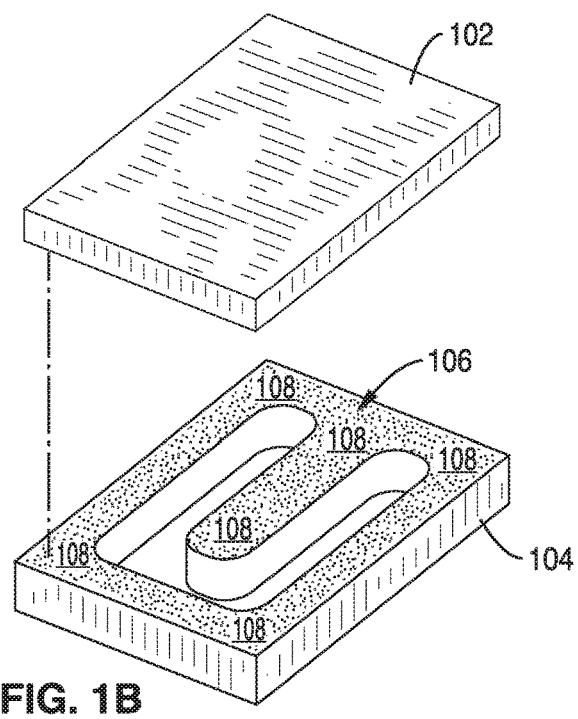
FIG. 1B is a schematic diagram of adhesive applied to the surface of the second component along the joint areas that will be in contact.
Figure 1C:
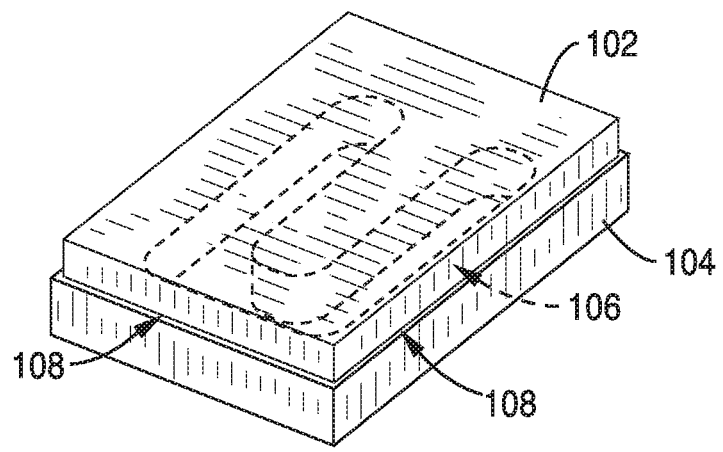
FIG. 1C is a schematic diagram of the two components glued together after applying external pressure.

Referring to FIG. 1B, adhesive 106 is applied to the second plastic component 104. The adhesive 106 can be applied to any of the components to be joined as long as it is applied to the joint areas 108. The adhesive 106 can be RTV silicone, epoxy cement, or any other adhesive recommended for the materials to be joined. After the adhesive 106 is applied, the two component surfaces are put in contact with each other by applying external pressure to assure the components are glued together with the adhesive, as shown in FIG. 1C.

Figure 1D:
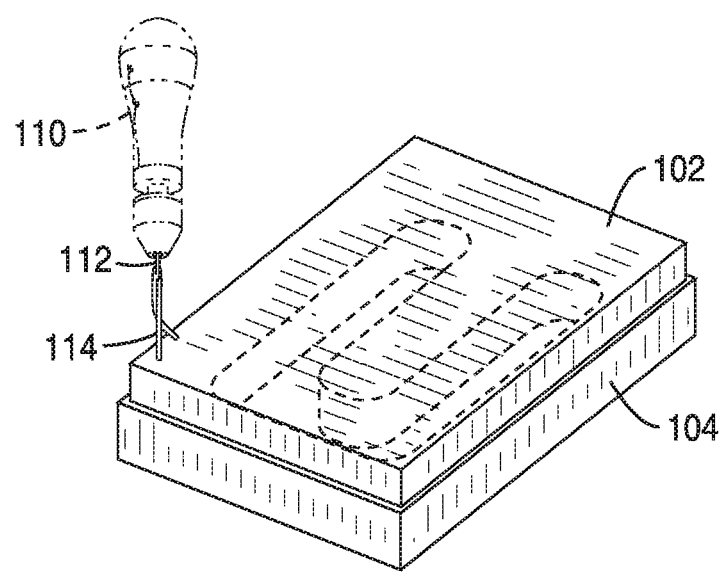
FIG. 1D is a schematic diagram showing how the glued components are sewn together using a standard awl with a threaded needle.

Once an adhesive seal is attained, and preferably before the adhesive is fully cured, the components can be sewn together at the joint areas of contact 108 using a standard awl 110 with a threaded needle 112, as shown in FIG. 1D. One of ordinary skill in the art will appreciate that any other tool appropriate for the component materials and application may be used. As an alternative to using a manual awl 110, a sewing machine (not shown) could also be used to sew stitches for adequate reinforcement of joints. The sewing process is similar to sewing together two pieces of leather or denim. Thread 114, including nylon monofilaments, silk, or cotton of various diameters and strengths, can be used for stitching, depending on the application. Care should be taken to tighten each stitch.

Figure 2A:
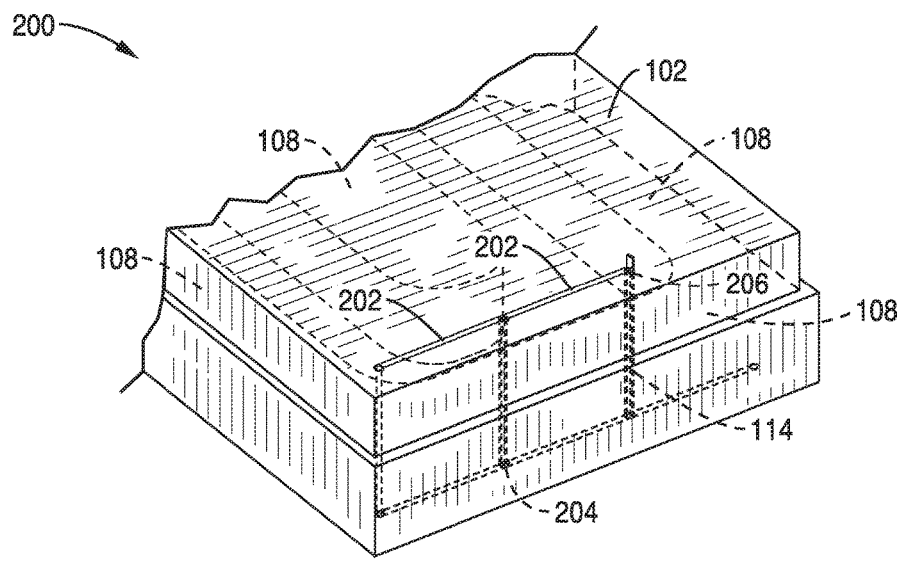
FIG. 2A and FIG. 2B are schematic diagrams showing close up views of the stitching through the two components of the embodiment shown in FIG. 1A through FIG. 1D.
Figure 2B:
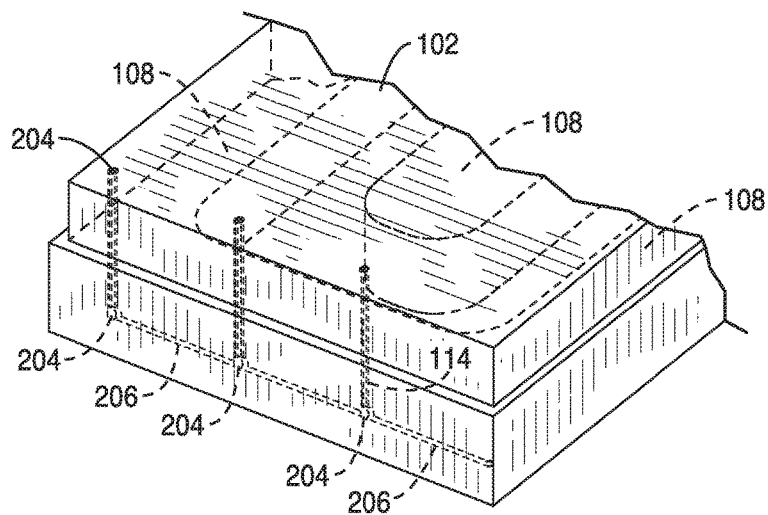

FIG. 2A and FIG. 2B are schematic diagrams showing close up views 200 of the stitching through the two components 102, 104 that have been joined together by adhesive 108. FIG. 2A shows the upper stitches 202 with knots 204 that can be used to secure the stitching. In FIG. 2B, the lower stitches 206 are shown with knots 204 that can be used to secure and tighten the stitching.

EXAMPLE

While the use of adhesives alone to join two pieces of plastic materials may be sufficient for many practical applications, in several circumstances, the mechanical strength of the adhesives per unit of joint area is insufficient and often subject to deterioration at the contact area by external manipulation. Though these are general issues, they are a common problem whenever metal or rigid plastic plates must be used to seal cavities in which the joint surface area is relatively small with respect to the overall dimensions of the object.

FIG. 3A through FIG. 3E show an example embodiment of the method 300, in which a 0.006 inch copper sheet 302 was joined to a three-dimensional (3D) silicone mold 304 with an internal cavity, as shown in FIG. 3A.

In this example, small holes 306 were drilled into the copper sheet 302 forming a pattern to pre-match the joint areas of contact 308, as shown in FIG. 3B. The size of these holes depends on the type of needles and threads to be used. In this example, a #57 drill bit was used for a regular point titanium commercial (100/16) sewing machine needle. However, the aspects of the approach do not depend on the particular choice of needle or hole size.

Referring to FIG. 3C, an adhesive 310 (RTV silicone, epoxy cement, or any other adhesive recommended for the materials to be joined) is then applied to the joint areas of contact 308 of the plastic (silicone) mold 304. Although not shown, the adhesive may also be applied to the copper (metal) plate 302. Subsequently, the copper plate 302 and the plastic mold 304 were put in contact with each other by applying external pressure to assure the components were glued together with the adhesive 310, as shown in FIG. 3D.

Referring to FIG. 3E, once the adhesive seal was attained, the mold 304 and plate 302 were sewn together using a standard awl 312 with a threaded needle 314 or any other tool appropriate for the component materials and application, following the predetermined pattern of holes. The sewing process is similar to sewing together two pieces of leather or denim. In this specific example, microfilament braided fishing line (65 lb. test; 0.41 mm in diameter) was used as the thread 316. Other threads, including nylon monofilaments, silk, or cotton of various diameters and strengths, can be chosen depending on the application. Care was taken to tighten each stitch.

FIG. 4A and FIG. 4B are schematic diagrams 400 illustrating the features of two finished stitches 402, 406 across the metal plate 302 and plastic mold 304. It should be noted that in this example embodiment, the plastic mold 304 does not have pre-set holes 306 because the needle 314 and thread 316 can readily penetrate it, creating a tight seal around the thread 316. In other applications of the present technology, however, it may be necessary to drill pre-set holes 306 matching those in the metal plate 302. FIG. 4A is a top perspective detail view that shows the upper stitches 402 with knots 404 that can be used to secure the stitching. In FIG. 2B, the lower stitches 406 are shown with knots 404 that can be used to secure the stitching 402, 406.

As an alternative to using a manual awl 312, a sewing machine (not shown) could be used to sew stitches for adequate reinforcement of joints areas of contact 308. When using a sewing machine to sew a metal plate (or foil) to a plastic structure, the pre-drilled holes in the metal plate should be carefully distanced apart along a straight line in order to match the pitch of the machine. If this precaution is taken, once the holes are made in the metal plate, it will be sufficient to align the first stitch and then automatically proceed over an entire joint.

The technology of this disclosure is particularly well-suited for use when air or water tight joints between components of the same or dissimilar materials are desired. In this case, the use of adhesives alone is usually insufficient for the joints to support pressurization. The advantage of the use of stitching, as described herein, is that the joints are mechanically reinforced while maintaining their overall flexibility, intrinsically provided by the properties of the stitching material.

The technology of this disclosure has been tested and found to provide superior reinforcement of joints between metals and silicone molds. Using a wide variety of commercial RTV adhesives typically recommended for water/air tight seals, stitch reinforcement as described herein creates stable air/water tight joints when tested under pressure. Under identical conditions, unreinforced joints invariably failed, resulting in separation of the joint surfaces and allowing water and/or gas to flow through the joints.

From the description herein, it will be appreciated that that the present disclosure encompasses multiple embodiments which include, but are not limited to, the following:

1. A method for joining two components with mechanically stable joints, the method comprising: applying an adhesive between a first component and a second component, wherein the adhesive is applied to an area of contact between the first component and the second component forming one or more joint areas; bringing opposing surfaces of the components into contact; applying compressive pressure to the components to join and seal the opposing surfaces in the one or more joint areas of contact; and using a stitching material, stitching the first component to the second component at the one or more joint areas.

2. The method of any preceding embodiment, wherein the stitching material is a plastic thread or a natural thread material.

3. The method of any preceding embodiment, further comprising: tightening stitches of the stitching material such that a gas and liquid tight seal is formed between the components in the joint areas of contact.

4. The method of any preceding embodiment, wherein stitching the first component to the second component at the one or more joint areas maintains flexibility of the components in the joint areas of contact.

5. The method of any preceding embodiment, further comprising: drilling a pattern of holes in the first component; and stitching the first component to the second component at the one or more joint areas using the pattern of holes in the first component as a guide.

6. The method of any preceding embodiment, further comprising: drilling a pattern of holes in the second component that match the pattern of holes in the first component.

7. The method of any preceding embodiment, wherein stitching the first component to the second component creates a tight seal around the stitching material with adhesive and one or more knots.

8. A method for joining a metal plate and a synthetic mold with mechanically stable joints, the method comprising: drilling a pattern of holes in a metal plate corresponding to desired joint areas of contact between the metal plate and a synthetic mold; applying an adhesive between the metal plate and the mold in one or more joint areas of contact; bringing opposing surfaces of the metal plate and the mold into contact; applying compressive pressure to the plate and the mold to join and seal the opposing surfaces in the one or more joint areas of contact; and using a stitching material, stitching the metal plate to the mold using the pattern of holes in the metal plate as a guide.

9. The method of any preceding embodiment, wherein the stitching material is a plastic thread or a natural thread material.

10. The method of any preceding embodiment, further comprising: tightening stitches of the stitching material such that a gas and liquid tight seal is formed between the components in the joint areas of contact.

11. The method of any preceding embodiment, wherein stitching the metal plate to the mold at the one or more joint areas maintains flexibility of the joint areas of contact.

12. The method of any preceding embodiment, further comprising: drilling a pattern of holes in the mold that match the pattern of holes in the metal plate.

13. The method of any preceding embodiment, wherein stitching the first component to the second component creates a tight seal around the stitching material with adhesive and one or more knots.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method for joining two components with mechanically stable joints, the method comprising:
   applying an adhesive between a first component, wherein the first component is a synthetic mold with an internal cavity, and a second component, wherein the second component is a metal plate, and wherein the adhesive is applied to an area of contact between the first component and the second component forming one or more joint areas;

bringing opposing surfaces of the first and second components into contact;

applying compressive pressure to the components to join and seal the opposing surfaces in the one or more joint areas of contact;

using a stitching material, wherein the stitching material is a plastic thread or a natural thread material, and stitching the first component to the second component at the one or more joint areas, wherein stitching the first component to the second component at the one or more joint areas maintains flexibility of the components in the joint areas of contact; and tightening stitches of the stitching material with one or more knots such that a gas and liquid tight seal is formed between the components in the joint areas of contact.

2. The method of claim 1, further comprising:

drilling a pattern of holes in the first component; and stitching the first component to the second component at the one or more joint areas using the pattern of holes in the first component as a guide.

3. The method of claim 2, further comprising:

drilling a pattern of holes in the second component that match the pattern of holes in the first component.

4. A method for joining a metal plate and a synthetic mold with mechanically stable joints, the method comprising:

drilling a pattern of holes in a copper metal plate corresponding to desired joint areas of contact between the copper metal plate and the synthetic mold with an internal cavity;

applying an adhesive between the copper metal plate and the synthetic mold in one or more joint areas of contact;

bringing opposing surfaces of the copper metal plate and the synthetic mold into contact;

applying compressive pressure to the copper metal plate and the synthetic mold to join and seal the opposing surfaces in the one or more joint areas of contact;

using a stitching material, wherein the stitching material is a plastic thread or a natural thread material, and stitching the copper metal plate to the synthetic mold using the pattern of holes in the copper metal plate as a guide; and tightening the stitches of the stitching material with one or more knots;

wherein stitching the copper metal plate to the synthetic mold creates a tight seal around the stitching material with adhesive with the one or more knots, and wherein stitching the copper metal plate to the synthetic mold at the one or more joint areas maintains flexibility of the joint areas of contact.

5. The method of claim 4, further comprising:

drilling a pattern of holes in the mold that match the pattern of holes in the metal plate.

* * * * *